Feb. 20, 1962   F. G. REUTER   3,022,128
BEARING BUSHING
Filed July 3, 1959

Inventor:
F. G. Reuter
By
Richards & Geier
ATTORNEYS

United States Patent Office 3,022,128
Patented Feb. 20, 1962

3,022,128
BEARING BUSHING
Franz Gottfried Reuter, Lemforde, Germany, assignor to Lemforder Metallwarengesellschaft m.b.H., Lemforde, Germany
Filed July 3, 1959, Ser. No. 824,882
2 Claims. (Cl. 308—238)

For lining bearing housings or bores, it is known to use bushings which serve as plain or sliding bearings for shafts, rods, and the like. It is also known to use for such bearing bushings plastic materials, preferably polyurethane, because this plastic is particularly abrasion-resistant, is not affected in any way by oil and gasoline, and also possesses unsurpassed properties as far as resistance against aging is concerned. However, this plastic material as well as many other plastics of similar type, is not quite satisfactory as bushing material in the known applications, because the elastic bushing body alone does not provide sufficient support in relation to the housing bore which is to be lined, so that the bushing material is frequently squeezed or jammed.

It is therefore an object of the present invention to provide a bearing bushing in which full use is made of the advantages of the elastic plastic material, particularly polyurethane, without any detrimental secondary effects. Experiments have shown that the plastic bushings lose their undesirable properties immediately when they are subjected to high initial tension or pre-loading in the housing. However, since on the one hand the insertion of the bushings into the housing bore can be accomplished only with special tools and under specific conditions, whereby thermal as well as dimensional specifications must be exactly complied with, and on the other hand steps must be taken to prevent rotation of the bearing bushings in the housing bore, which is of particular importance when the bearing is to be connected to a lubricating circuit, the invention in application of the aforementioned findings provides a bearing bushing comprising an inner bushing consisting of plastic material, preferably polyurethane, and an outer metal sleeve which surrounds said plastic bushing and into which the latter is pressed with high initial tension or preloading, one or both of the contacting surfaces of the two bushings comprising means for firmly anchoring both elements with regard to each other so as to form a unitary bearing bushing.

According to the present invention not only the existing disadvantages of prior art devices are avoided, but there is also provided a bushing body which can be kept in stock just as any other usual type of metal bushing and which can be inserted into the housing bore in the well-known simple manner without the use of special tools.

There is a great variety of possibilities for anchoring the plastic bushing in the metal sleeve by providing the contacting wall surfaces with suitable profiles. It has been found to be of particular advantage if, according to a further feature of the present invention, the outer wall surface of the plastic bushing and/or the inner wall surface of the metal sleeve are provided with a wave-shaped or corrugated surface whereby a particularly firm frictional fit is obtained.

Conveniently, the inner bore of the plastic bushing is finished to the final dimension only after the bushing has been pressed into the metal sleeve, since the changes in the elastic bushing which occur during pressing-in are of a variable nature and cannot be exactly predetermined and controlled. In view of the fact that the complete bearing bushing may thus be manufactured to extremely accurate dimensions, there is no need for any finishing after the bushing has been installed in the housing.

It is a further object of the present invention to provide a bearing bushing in which the inner plastic bushing is divided into two bushing parts and the space remaining therebetween is filled by a corrugated or otherwise shaped annular spring, in order to permit expansion of the plastic material towards the center against said annular spring in case of axial elongation of said plastic bushing. Thereby undesirable compression and increased friction are avoided which would otherwise occur during operation of the installed bearing bushing already with the slightest protrusion of the plastic bushing beyond the edge of the outer metal sleeve.

Various embodiments of the present invention which are given by way of example only are shown in the accompanying drawing, in which.

Figure 1:
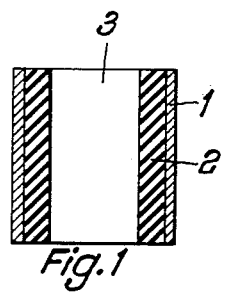
FIG. 1 is a sectional view of a bearing bushing taken on line I—I of FIG. 2.

In the drawing, reference numeral 1 designates the metallic outer sleeve, whereas the plastic bushing is designated by reference numeral 2. According to the present invention the plastic bushing 2 which preferably consists of polyurethane, is pressed into the metal sleeve 1 with high initial tension or pre-loading. After the plastic bushing has been pressed in, its inner bore 3 is finished to the exact final dimension.

Figure 2:
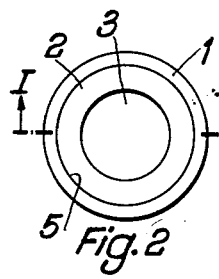
FIG. 2 is a plan view of the bearing bushing shown in FIG. 1.
Figure 3:
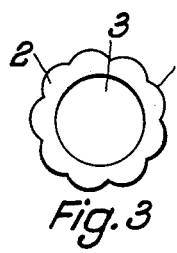
FIG. 3 is a plan view of the inner plastic bushing with corrugated outer surface prior to insertion into the metal sleeve.

In the embodiment shown in FIGS. 1 to 3, the outer wall of the plastic bushing 2 is provided with a corrugated surface 4 for anchoring the plastic bushing 2 in the metal sleeve 1, whereas the inner bore 5 of the metal sleeve 1 has a smooth non-profiled surface.

Figure 4:
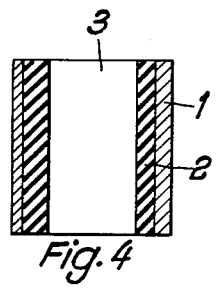
FIGS. 4 to 6 show a bearing bushing in which, contrary to the embodiment shown in FIGS. 1 to 3, the inner wall of the metal sleeve is provided with a corrugated surface.
Figure 5:
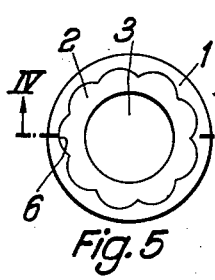
Figure 6:
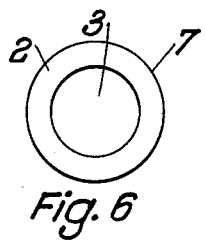

In the embodiment shown in FIGS. 4 to 6 this arrangement has been reversed, i.e. the bore of the metal sleeve 1 has been given a corrugated surface 6, whereas the plastic bushing 2 presents a smooth non-profiled outer wall surface 7.

Figure 7:
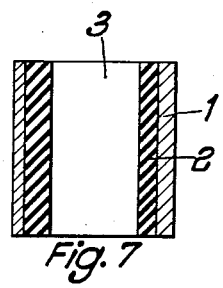
FIGS. 7 to 9 show a bearing bushing in which both bushing elements have corrugated contact surfaces.
Figure 8:
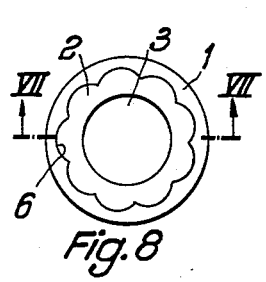
Figure 9:
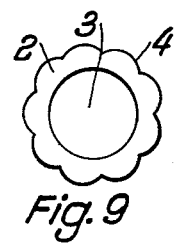

FIGS. 7 to 9 show a bearing bushing according to the present invention in which both contacting walls 4 and 6 are provided with mating corrugated surfaces.

It is, of course, also possible to provide other surface profiles for firmly anchoring the two bushing elements, without leaving the scope of the present invention.

In order to provide a maintenance-free, self-lubricating bearing bushing, the invention further proposes to add to the polyurethane during the manufacturing process substances having a lubricating effect, such as silicon oils, hydrocarbons, molybdenum sulfides or sulfur whereby the coefficient of friction is substantially reduced.

Figure 10:
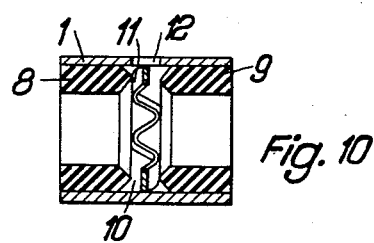
FIG. 10 is a sectional view of a bearing bushing with divided inner bushing.

According to the embodiment illustrated in FIG. 10, the plastic bushing arranged within the metal sleeve 1 comprises two bushing parts 8 and 9 leaving between them a space 10 which is filled by a corrugated annular spring 11 contacting both said bushing parts. The space 10 filled by the annular spring 11 also serves as a lubricating channel, the lubricant being supplied through a bore 12 in the metal sleeve 1. The division of the inner bushing into two bushing parts with a space therebetween serves to accommodate axial expansion of the plastic bushing during operation of the bearing. The annular spring 11 inserted between the bushing parts permits at any time an expansion of the bushing parts 8, 9 in an axial direction towards the annular spring 11, so that compression and increased frictional loads cannot occur at the ends of the bearing bushing.

I claim:

1. A bearing bushing comprising an inner bushing of elastic plastic material, a hard metal outer sleeve surrounding said inner bushing, said inner bushing being pressed into said outer sleeve with high initial tension or pre-loading, and means provided on one or both contacting surfaces of said sleeve and said bushing for anchoring them to each other to form a unitary bearing bushing, said inner plastic bushing comprising two bushing parts arranged in spaced-apart relationship, the remaining interspace being filled by an annular spring.

2. A bearing bushing as claimed in claim 1, characterized in that said interspace between said bushing parts serves as a lubricating channel to which lubricant may be supplied through a bore in said metal sleeve.

References Cited in the file of this patent

UNITED STATES PATENTS

| | | |
|---|---|---|
| 2,215,523 | Haushalter | Sept. 24, 1940 |
| 2,324,083 | Holmes | July 13, 1943 |
| 2,424,883 | Habgood | July 29, 1947 |
| 2,431,921 | Cook | Dec. 2, 1947 |
| 2,635,019 | Cochran | Apr. 14, 1953 |
| 2,708,143 | Kroyer et al. | May 10, 1955 |
| 2,815,253 | Spriggs | Dec. 3, 1957 |

FOREIGN PATENTS

| | | |
|---|---|---|
| 850,150 | France | Sept. 4, 1939 |